United States Patent
Tong et al.

(10) Patent No.: US 7,587,658 B1
(45) Date of Patent: Sep. 8, 2009

(54) ECC ENCODING FOR UNCORRECTABLE ERRORS

(75) Inventors: Ye Tong, Redwood City, CA (US); Ricky C. Hetherington, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 614 days.

(21) Appl. No.: 11/028,703

(22) Filed: Jan. 3, 2005

(51) Int. Cl.
*H03M 13/00* (2006.01)
(52) U.S. Cl. ........................... 714/785; 714/763
(58) Field of Classification Search ............... 714/763, 714/785
See application file for complete search history.

(56) References Cited

U.S. PATENT DOCUMENTS

| | | | |
|---|---|---|---|
| 5,014,273 A * | 5/1991 | Gagliardo et al. ........... | 714/758 |
| 5,627,965 A | 5/1997 | Liddell et al. | |
| 5,754,567 A * | 5/1998 | Norman ....................... | 714/773 |
| 5,856,987 A * | 1/1999 | Holman ....................... | 714/752 |
| 5,889,940 A | 3/1999 | Liddell et al. | |
| 6,038,684 A | 3/2000 | Liddell et al. | |
| 6,047,392 A | 4/2000 | Liddell et al. | |
| 6,092,218 A | 7/2000 | Liddell et al. | |
| 6,134,672 A | 10/2000 | Liddell et al. | |
| 6,134,679 A | 10/2000 | Liddell et al. | |
| 6,141,766 A | 10/2000 | Liddell et al. | |
| 6,170,068 B1 | 1/2001 | Liddell et al. | |
| 6,173,416 B1 | 1/2001 | Liddell et al. | |
| 6,304,992 B1 | 10/2001 | Cypher | |
| 6,519,704 B1 | 2/2003 | Liddell et al. | |
| 6,539,513 B1 * | 3/2003 | Chen ........................... | 714/758 |
| 6,574,768 B2 * | 6/2003 | Cypher ........................ | 714/758 |
| 2004/0255225 A1 * | 12/2004 | Takai ........................... | 714/763 |

* cited by examiner

*Primary Examiner*—Guy J Lamarre
*Assistant Examiner*—Sam Rizk
(74) *Attorney, Agent, or Firm*—Rory D. Rankin; Meyertons Hood Kivlin Kowert & Goetzel, P.C.

(57) ABSTRACT

An error detecting and correcting method and mechanism. An error correcting code for data is utilized wherein a special syndrome pattern is used to indicate corresponding data includes a previously detected uncorrectable error. In response to receiving data and corresponding first check bits from a storage device, new check bits corresponding to the read data are generated. Based upon the read check bits and newly generated check bits, a syndrome is generated. If an uncorrectable error is detected, the newly generated check bits are inverted prior to be stored. Subsequent readers of the stored data will generate a syndrome which corresponds to the predetermined pattern and determine that the data includes a previously detected uncorrectable error. Data including an error corresponding to an previously detected uncorrectable error may be discarded and no error reported.

15 Claims, 5 Drawing Sheets

ECC ENCODING FOR UNCORRECTABLE ERRORS

BACKGROUND OF THE INVENTION

1. Field of the Invention

This invention is related to error correction and reporting systems.

2. Description of the Related Art

Error codes are commonly used in electronic and computing systems to detect and correct data errors, such as transmission errors or storage errors. For example, error codes may be used to detect and correct errors in data transmitted via any transmission medium (e.g. conductors and/or transmitting devices between chips in an electronic system, a network connect, a telephone line, a radio transmitter, etc.). Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Another source of errors in electrical systems may be so-called "soft" or "transient errors". Transient memory errors may be caused by the occurrence of an event, rather than a defect in the memory circuitry itself. Transient memory errors may occur due to, for example, random alpha particles striking the memory circuit. Transient communication errors may occur due to noise on the data paths, inaccurate sampling of the data due to clock drift, etc. On the other hand, "hard" or "persistent" errors may occur due to component failure.

Generally, various error detection code (EDC) and error correction code (ECC) schemes are used to detect and correct memory and/or communication errors. For example, parity may be used. With parity, a single parity bit is stored/transmitted for a given set of data bits, representing whether the number of binary ones in the data bits is even or odd. The parity is generated when the set of data bits is stored/transmitted and is checked when the set of data bits is accessed/received. If the parity doesn't match the accessed set of data bits, then an error is detected.

Other EDC/ECC schemes assign multiple check bits per set of data bits. The encodings are selected such that a bit error or errors may be detected, and in some cases the encodings may be selected such that the bit or bits in error may be identifiable so that the error can be corrected (depending on the number of bits in error and the ECC scheme being used). Typically, as the number of bit errors that can be detected and/or corrected increases, the number of check bits used in the scheme increases as well.

In some cases, a data error may be detected which cannot be corrected. In such cases, the uncorrectable error is generally reported. In response to the reported error, an error handling routine may be initiated. If the error is serious, a shutdown of the system may be required. Subsequently, a review may be conducted in order to determine the cause of the error. In some cases, an uncorrectable error may be propagated in such a way that it is reported multiple time by multiple components.

For example, a memory controller may fetch data which is to be stored in an L2 cache. The memory controller may detect an uncorrectable error in the fetched data, report the error, and store the data in the L2. Subsequently, the CPU may read the data, detect the error, and report the error. These multiple error reports may only serve to obscure the root cause of the problem.

In view of the above, an effective method and mechanism for handling and reporting data errors is desired.

SUMMARY OF THE INVENTION

Methods and mechanisms for performing error detection, correction, and reporting are contemplated.

In one embodiment, a method for performing error detection and correction are performed in which a syndrome with a special pattern is utilized. In one embodiment, an apparatus comprising one or more storage devices and error correction circuitry are contemplated. The storage devices are configured to store data and corresponding check bits, and the error correction circuitry is coupled to receive data and check bits from the storage devices. When data and corresponding first check bits are received, the error correction circuitry is configured to: generate a new set of check bits corresponding to the received data, and generate a syndrome using the newly generated check bits and the check bits which were received with the data. If the generated syndrome indicates an uncorrectable error in the data, the newly generated check bits are inverted prior to being stored in association with the corrupt data.

Also contemplated is error correction circuitry which is configured to subsequently receive the stored data and stored inverted second check bits, generate a new set of check bits corresponding to the received stored data, and again generate a syndrome using the received check bits and the new set of check bits. If the generated syndrome matches a predetermined pattern, the error correcting circuitry determines that the received stored data includes a previously detected uncorrectable error.

These and other embodiments will become apparent upon reference to the following description and accompanying drawings.

BRIEF DESCRIPTION OF THE DRAWINGS

The following detailed description makes reference to the accompanying drawings, which are now briefly described.

Figure 1:
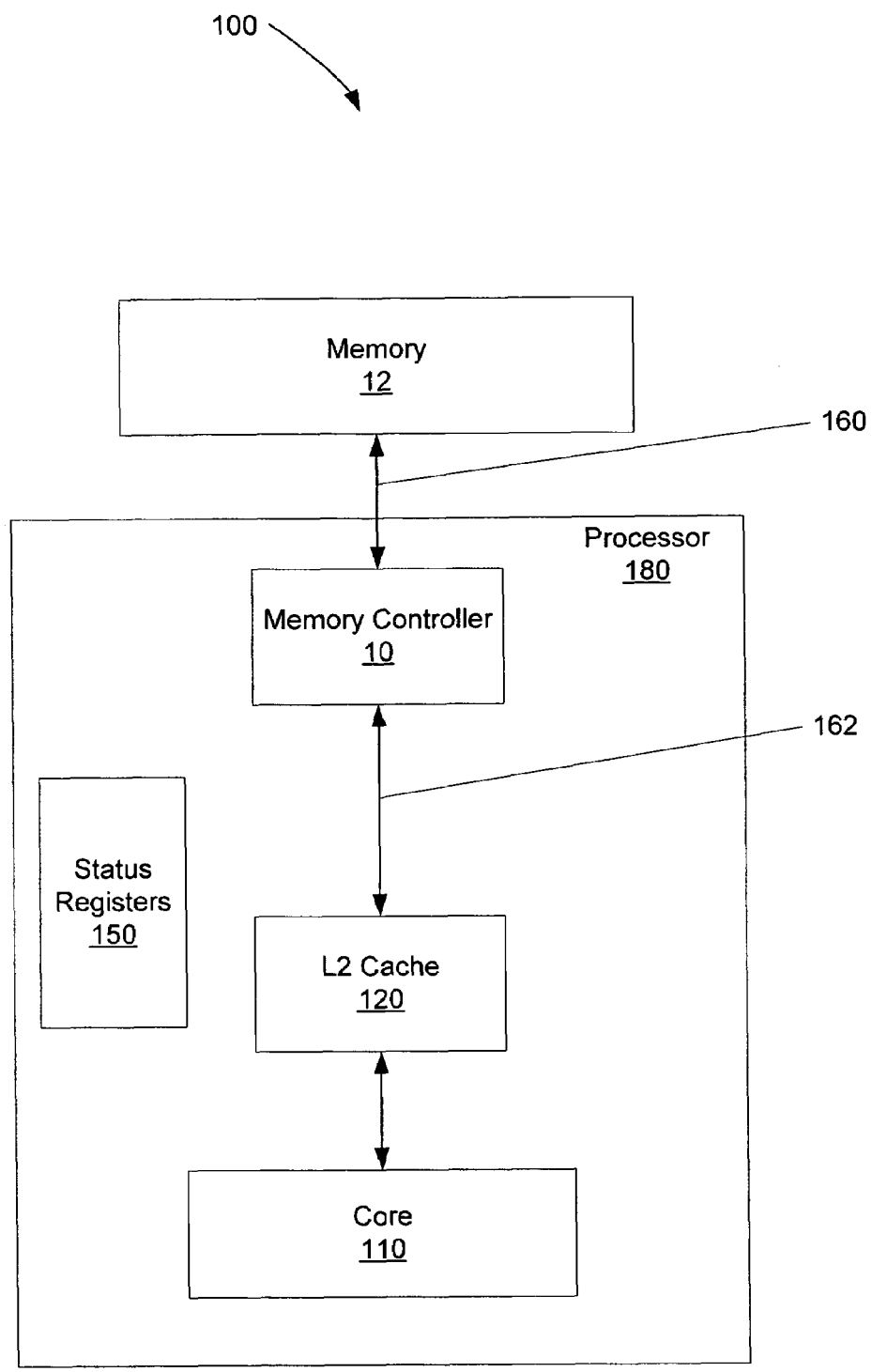
FIG. 1 is a block diagram of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 illustrates a block diagram of one embodiment of a computing system 100. Illustrated in FIG. 1 is a processor 180 coupled to a memory 12. Processor 180 includes a core 110, level 2 (L2) cache 120, memory controller 10, and status registers 150. In one embodiment, the memory controller 10 is configured to read data from, and write data to, the memory 12. Generally speaking, prior to writing data to memory 12, the memory controller 10 generates check bits corresponding to the data item to be written. These check bits (e.g., error correcting code (ECC) bits) are generally configured to provide correction and/or detection of errors in the corresponding data. Subsequent to generating the check bits, both the data and check bits are then written to the memory 12.

When reading data from memory, memory controller 10 is configured to read both the data and corresponding check bits which were previously generated. The memory controller 10 then regenerates check bits for the retrieved data and compares the regenerated check bits to the retrieved check bits. Based upon this comparison, the memory controller may detect the occurrence of one or more errors, and may also identify the bit location of a detected error. In one embodiment, the check bits are used to implement a single error correcting and double error detecting code (SEC/DED). Such a code can detect and correct single bit errors, and detect double bit errors. However, double bit errors cannot be corrected and may be deemed uncorrectable errors. In response to detecting an uncorrectable error, the memory controller 10 may report the error by setting a flag in status registers 150. In response to detecting and reporting the error, some suitable responsive action may be taken by the processor 180. For example, in the case of an uncorrectable error, an interrupt handler may be invoked which causes termination of one or more processes.

Generally speaking, memory controller 10 may also store data retrieved from memory 12 in L2 Cache 120. In some embodiments, retrieved data may be stored in the L2 Cache even when an uncorrectable error has been detected. Consequently, it is possible that the data may then be read from the L2 Cache by another entity (e.g., the core 110) which then detects the uncorrectable error and reports the error just as the memory controller 10 reported the error. As multiple reportings of errors may not be necessary or desirable, a special encoding of check bits may be used which indicates that not only does the corresponding data contain an uncorrectable error, but that the error has already been reported. In this manner, a subsequent reader of the data may know not to use the data and not to report any detected error therein. Further discussion of such a special encoding will be discussed further below.

Figure 2:
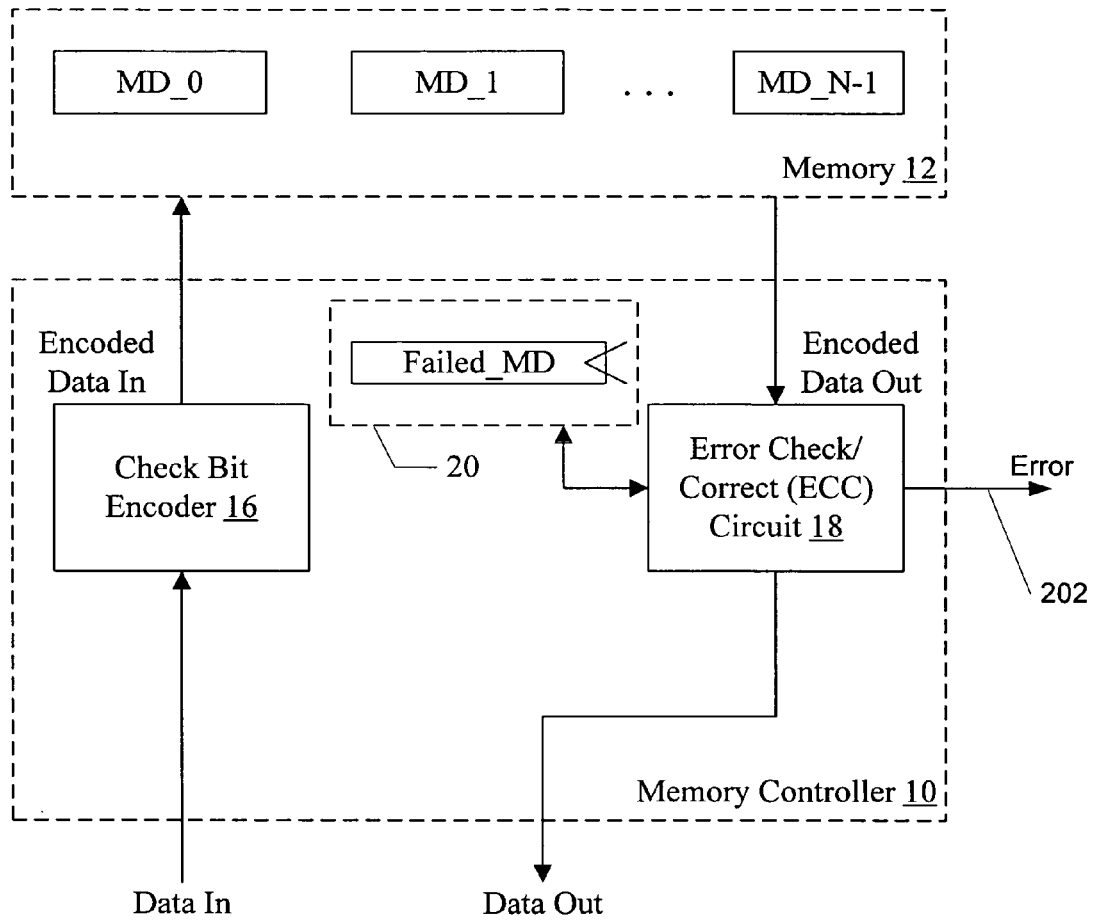
FIG. 2 is a block diagram of one embodiment of a memory controller.

Turning now to FIG. 2, a block diagram of one embodiment of a memory controller 10 and a memory 12 comprising a plurality of memory devices MD_0 to MD_N−1 is shown. In one embodiment there may be N memory devices total, where N is a positive integer. The memory controller 10 is coupled to the memory 12. In the illustrated embodiment, the memory controller 10 includes a check bit encoder circuit 16, an error check/correct (ECC) circuit 18, and a persistent state storage 20. The check bit encoder circuit 16 is coupled to receive data input to the memory controller (Data In), and to provide encoded data (Encoded Data In) to the memory 12 for storage. The ECC circuit 18 is coupled to receive encoded data read from the memory 12 (Encoded Data Out) to provide corresponding data (Data Out) to output from the memory controller 10. The ECC circuit 18 is further coupled to the persistent state storage 20.

The memory controller 10 is coupled to receive read and write requests from various sources (e.g. processors and/or peripheral devices in a computer system including the memory controller 10). The memory controller 10 may have any interface for receiving the read and write requests (e.g. a bus interface, a packet interface, etc.). In one particular embodiment, the memory controller 10 may support input and output, unidirectional, source synchronous interfaces for transferring address and data packets comprising a request.

The memory controller 10 is configured to encode data to be written to the memory with a plurality of check bits, thus generating the encoded data to be stored in the memory. Generally, the encoded data comprises the data supplied to the memory controller and the check bits, arranged in a predetermined fashion for storage in the various memory devices of the memory 12. Additionally, when encoded data is read from the memory 12, the ECC circuit 18 is configured to decode the encoded data to detect certain errors in the data and, in some cases, to correct the errors. The corrected data is supplied as an output of the memory controller 10.

The data written to the memory 12 by the memory controller 10 may comprise data from a write request received by the memory controller 10 ("Data In" in FIG. 2). In some embodiments, data written to the memory 12 may comprise data read from the memory 12 for which an error was detected and corrected. For example, in some embodiments, single bit errors may be corrected. In some embodiments, the memory controller 10 may track the number of recent correctable errors, and if the number is less than a threshold, the memory controller 10 may assume that the error is a transient error and may write the data (with the error corrected), back to the memory 12. In other embodiments, if a correctable error is detected during a memory read, the memory controller 10 may repeat the read to see if the error occurs again. If no error is detected in the repeated read, then the error may have been a transient signal error and no correction in the memory 12 is needed. If an error is detected again, then the memory controller 10 may write the corrected data back to memory. The memory controller 10 may again repeat the memory read, and if the same error occurs again then a hard error (component failure) may be detected.

The memory controller 10 may be configured to detect (and in some cases to correct) various errors by using the corresponding check bits. For example, as mentioned above, in one embodiment, the check bits may provide for detection and correction of the failure of a memory device. The correction may include reconstructing the data that was stored in the failed memory device using the check bits and the data from the other memory devices. The correction may also include "mapping out" the failed memory device such that the failed memory device is no longer used to store bits of encoded data blocks. In some embodiments, following detection of the failure of a memory device, the check bit encodings may continue to provide for single bit error detection and correction. In such an embodiment, double bit error detection may also be provided prior to the detection of a failed memory device if the bit errors occur in different memory devices. In still another embodiment, the check bit encodings provide for the detection and correction of a failed memory device as well as the detection and probabilistic correction of a failed memory module.

In one embodiment, persistent state storage 20 is configured to record state information regarding persistent failures which have been detected by the memory controller 10. In the illustrated embodiment, the persistent state may include an indication of a failed memory device (Failed_MD in FIG. 2). The persistent state storage 20 may be formed from any type of persistent storage (e.g. registers, memory arrays, etc.). In addition, ECC circuit 18 is also configured to convey an indication 202 of an error detected within data read from memory 12. Such an indication 202 may include setting a predetermined value in a status register 150 (as shown in FIG. 1), invoking an interrupt handler, and performing any other suitable action.

A write request may supply up to a predetermined amount of data to be written to the memory, and similarly a read request may transfer up to a predetermined amount of data from the memory. For example, in one embodiment, a read or write request may supply a cache line of data. The cache line may be of any size (e.g. 32 bytes, 64 bytes, 128 bytes, etc.). In one particular implementation, a cache line may comprise 64 bytes of data (512 bits). The data supplied via a write request may further include metadata bits in some embodiments. Generally, metadata bits may be used to describe various properties of the corresponding cache line (e.g. type of data, coherency information, etc.). Any metadata used by the producers and consumers of the data (e.g. processors) may be encoded in the metadata.

The cache line may be divided into one or more data blocks. Check bits are generated for each data block independent of the other data blocks corresponding to a given cache line. The encoded data block (comprising the data bits, metadata bits if applicable, and the check bits arranged in a predetermined fashion) corresponding to each data block is referred to as a code word herein. A portion of the code word may be stored in each memory device MD_0 to MD_N−1.

As used herein, a memory device includes any memory packaged into a single device package having pins for accessing the memory device for writing and reading data stored therein. For example, a memory device may include a dynamic random access memory (DRAM) of any type (e.g. asynchronous DRAM, synchronous DRAM (SDRAM), RAMBUS DRAM (RDRAM), double data rate SDRAM (DDR SDRAM), etc.). A memory device may also include static RAM (SRAM), flash memory, etc. A memory device may include any memory which is subject to transient or persistent errors. In some embodiments, a memory device may be a single chip. In some cases, two or more memory devices may be included on a memory module. A memory module is a circuit board to which two or more memory devices have been attached. For example, memory modules may include dual inline memory modules (DIMMs), single inline memory modules (SIMMs), and any other type of memory modules.

As used herein, a check bit refers to a bit which is generated from two or more data bits and/or other check bits for providing error detection in the data bits/check bits (and optionally, depending on the definition of the check bits as a whole, error correction). A first check bit may be referred to as "covering" a given data bit or given check bit if: (i) the given data bit/check bit is used in the generation of the first check bit (and thus the first check bit aids in the error detection/correction of that data bit/check bit); or (ii) the given check bit is the first check bit (that is, the first check bit may cover itself). For example, a check bit may be generated from two or more data bits/check bits by exclusive OR (XOR) or exclusive NOR (XNOR) of the two or more data bits/check bits.

It is noted that various buffers and/or queues (not shown) may be included in the memory controller 10 as desired for buffering data. Furthermore, read and write requests to the memory 12 generally include an address to select the memory locations within each memory device that are read or written, control lines to control the access to the memory, etc., which have not been illustrated in FIG. 2.

Thus, the memory controller 10 may include other circuitry (not shown) controlling the read and write of the memory 12. Additionally, the memory controller 10 may include circuitry (not shown) for interfacing to the source(s) of memory requests.

The memory 12 may have any desired arrangement. For example, the memory 12 may be arranged into a plurality of banks. The memory devices MD_0 to MD_N−1 may be part of one bank, and other memory devices (not shown) may be part of other banks. As mentioned above, the memory devices may be configured onto memory modules, which may be part of one or more memory banks, as desired.

In one embodiment, system 100 may be configured to use a Hamming code to detect and correct errors. The check bits in a Hamming code are parity bits for portions of the data bits. Each check bit provides the parity for a unique subset of the data bits. If an error occurs (i.e. one or more bits change state), one or more syndrome bits will be asserted (assuming the error is within the class of errors covered by the code). Generally speaking, syndrome bits are generated by regenerating the check bits and comparing the regenerated check bits to the original check bits. If the regenerated check bits differ from the original check bits, an error has occurred and one or more syndrome bits will be asserted. The particular syndrome bits which are asserted may also be used to determine which data bit has changed its state (i.e., which data bit is in error), and enable the correction of the error. For example, if one data bit changes state, this data bit will modify one or more check bits. Because each data bit contributes to a unique group of check bits, the check bits that are modified will identify the data bit that changed state. The error may then be corrected by inverting the bit identified to be erroneous.

One common use of Hamming codes is to correct single bit errors within a group of data. Generally speaking, the number of check bits must be large enough such that $2^k-1$ is greater than or equal to n, where k is the number of check bits and n is the number of data bits plus the number of check bits. Accordingly, six check bits are required to implement a single error correcting Hamming code for 32 bits data block. A single error correcting Hamming code is able to detect and correct a single error. The error detection capability of the code may be increased by adding an additional check bit. The use of an additional check bit allows the Hamming code to detect double bit errors and correct single bit errors. Consequently, seven check bits may be used to implement a single error correcting, double error detecting Hamming code. The addition of a bit to increase the data detection capabilities of a Hamming code may be referred to as an extended Hamming code.

In a single error correction code, such as a Hamming code, multiple bit errors may cause one or more syndromes to be non-zero. However, multiple bit errors may erroneously appear as a single bit error in a different bit position. For example, in a single error correcting Hamming code with six check bits, one bit error may cause two check bits to change states. Another bit error may cause two other check bits to change state. Accordingly, if these two errors occur, four check bits will change state. Unfortunately, a one-bit error in still another bit position may cause those same four check bits to change state. The error correction procedure may assume the bit that affects all four check bits changed state and invert the data bit. If the check bit changes were actually caused by two bit errors, the error correction procedure has inverted a non-erroneous bit. Accordingly, the error correction procedure has created more errors, and may erroneously indicate that the data is error free.

The addition of an extended parity bit may resolve this problem. When the data is read from memory, the check bits and extended parity bit are regenerated and compared to the original check bits and extended parity bit. If the regenerated check bits are different than the original check bits, the extended parity bit may be used to determine whether one or two bit errors occurred. Such an error correcting code may be referred to as Single Error Correcting/Double Error Detecting (SEC/DED). If one error occurs, the regenerated extended parity bit will differ from the original extended parity bit. If two errors occur, the regenerated extended parity bit will be the same as the original extended parity bit. If one or more check bits change state and the regenerated extended parity bit is different, a single bit error has occurred and is corrected. Alternatively, if one or more check bits change state and the extended parity bit is the same, two bit errors are detected and no correction is performed. In the latter case, an uncorrectable error may be reported. It is noted, that more than two bit errors in a logical group is not within the class of errors addressed by the error correcting code. Accordingly, three or more errors may go undetected or the error correcting code may interpret the errors as a single bit error and invert a data bit that was not erroneous.

As described above, error correcting codes are commonly used as the basis for error reporting. While a particular system may be configured to report numerous types of errors, it may be particularly important to report uncorrectable errors. As noted above, in order to prevent uncorrectable (or other) errors from being reported multiple times, an indication may be stored with data which indicates whether or not an uncorrectable error has been detected. If a component then accesses that data, it may detect that an uncorrectable error has already been detected and it is not necessary to report the error.

Figure 3:
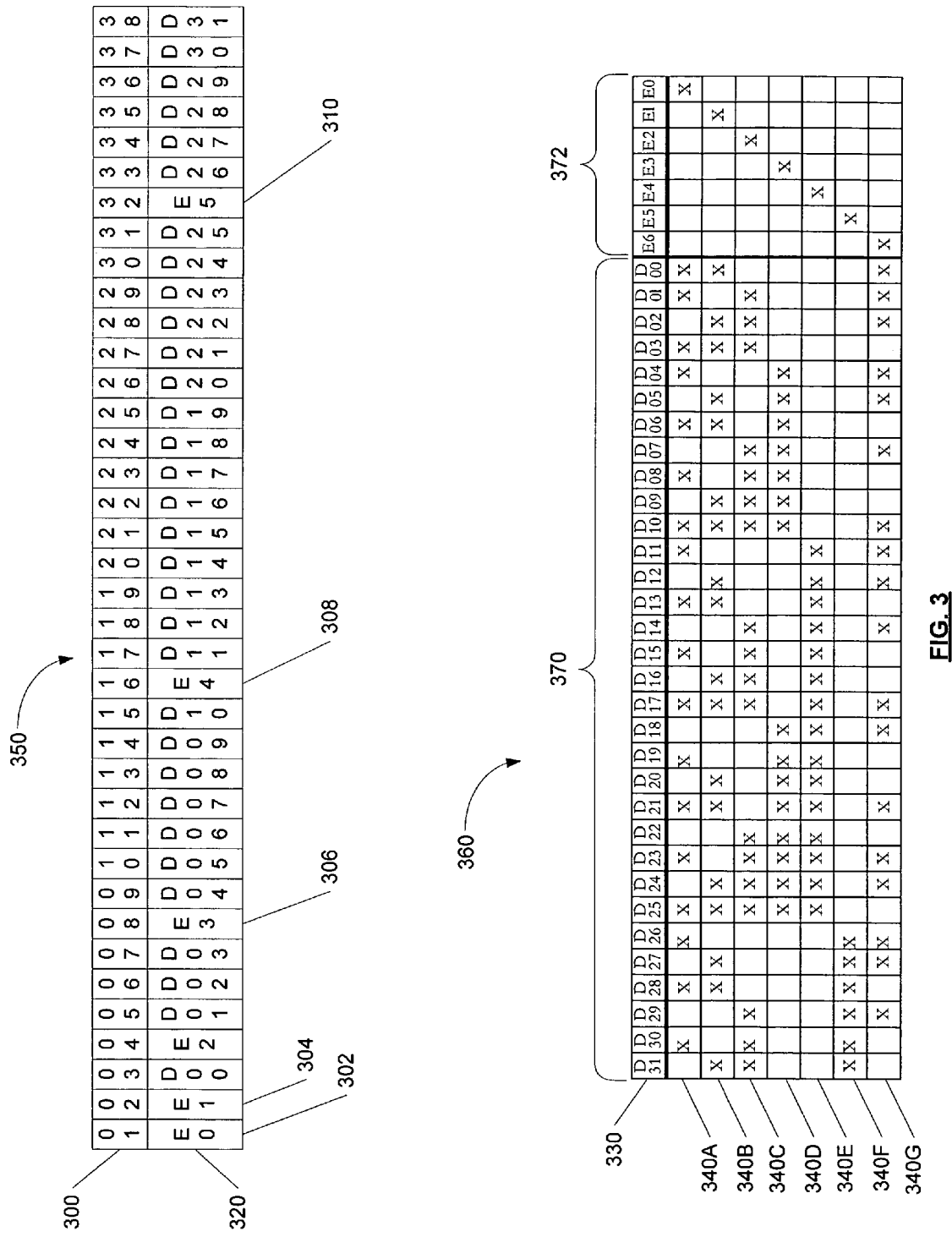
FIG. 3 illustrates one embodiment of an error correcting code.

Turning now to FIG. 3, one embodiment of an error correcting code is described. In the illustrated embodiment, an SEC/DED code for 32 data bits is illustrated. In such an embodiment, seven check bits are used. Six of the check bits are generally used for identifying and correcting a single bit error, and the seventh check bit is generally used for detecting a double bit error. A first table 350 in FIG. 3 depicts one embodiment of the storage of data bits and corresponding check bits. Table 350 includes a first row 300 which indicates a particular bit position (01-38). A second row of table 350 identifies the corresponding data or check bit stored in that bit position.

In row 320 of table 350, data bits are indicated as D00-D31, and (error) check bits are indicated as E0-E5. It is noted that only six check bits are shown in table 350. As the seventh check bit is used for detecting double bit errors, the seventh bit may be stored before the first bit of table 350, after the last bit of table 350, or otherwise. In the embodiment shown, the check bits appear in bit positions which correspond to powers of two (i.e., bit positions 1 ($2^0$), 2, 4, 8, 16, and 32). The data bits, D00-D31, are inserted in sequence in the remaining bit positions.

A second table 360 depicts one embodiment of how the check bits of table 350 may be generated. Note that table 360 also illustrates the generation of a seventh check bit, E6, even though that check bit is not shown in table 350. A first row 330 identifies a particular data bit (portion 370) or check bit (portion 372).

Succeeding rows 340A-340G indicate (but an "X") which data bits are used in generating a particular check bit. In one embodiment, each check bit is generated by performing an exclusive OR (XOR) operation on selected data bits. For example, row 340A shows an "X" in the column corresponding to check bit E0. Therefore, the data bits which are identified in row 340A are those which are used to generate E0. In this particular embodiment, data bits D30, D28, D26, D25, D23, D21, D19, D17, D15, D13, D11, D10, D08, D06, D04, D03, D01, and D00 are used to generate check bit E0. Each of the remaining check bits E1-E6 are generated in a similar manner by the indicated data bits. It is to be understood, the specific encoding described herein are intended for exemplary purposes only. Alternative codes and encodings may be utilized with the methods and mechanisms described herein. A variety of such alternatives are possible and are contemplated.

Based upon the tables depicted in FIG. 3, check bits may be generated when data is read from, or written to, a memory device. As described above, prior to writing data to memory, check bits may be generated and stored with the data. When data is read from memory, the check bits which are stored with the data are also read from the memory. New check bits are then generated for the data and compared to the check bits which were stored with the data. If the newly generated and stored check bits do not match, an error has occurred.

In one embodiment, a syndrome is generated from the newly generated check bits and the stored check bits by performing a bitwise XOR on the respective bits. If the syndrome is equal to zero, then no error is detected. If an odd number of bits of the syndrome are "1", then a single bit error is detected. If an even number of bits of the syndrome are "1", then an uncorrectable (e.g., double bit) error is detected.

In the event of a detected single bit error, the single error correcting syndrome bits (i.e., the syndrome bits corresponding to check bit positions E0-E5) are decoded to determine the location of the bit error. In one embodiment, bits E0-E5 of the syndrome comprise a binary number which represents the bit position of the erroneous bit. For example, if these syndrome bits are $100110_2$, the erroneous bit is in bit position $38_{10}$, which according to table 350 in FIG. 3 is data bit D31. Therefore, correction of the error may be achieved by inverting the value of D31.

In the example above, it is noted that there are only 38 bits which are stored as the combined data and check bits. Consequently, when a single bit error is detected, the syndrome should not represent a value greater than $38_{10}$. While such an error may be detected as a correctable single bit error, it may in fact represent an uncorrectable error. Should such a scenario occur, the error may be erroneously classified as a correctable error. However, since the syndrome value is not valid, the error will not be corrected. Further, as discussed above, data is generally stored in a memory device along with check bits which have been generated for the data. So, for example, if a memory controller reads data from memory, generates check bits, and detects an error, the read data and newly generated check bits may be stored in a cache, system memory, or other device. In the case of a single bit error with syndrome value greater than $38_{10}$, the erroneous data may be re-stored.

Generally speaking, data including uncorrectable errors should not be used as if it had no errors. Therefore, it is desirable to handle uncorrectable errors in a particular manner. As discussed above, a syndrome with an even number of "1"s may be detected and reported as an uncorrectable error. Such detected uncorrectable errors are identified and may be handled appropriately (e.g., by reporting and invoking a special handler). However, as the data with an uncorrectable error may be re-stored and re-read prior to completion of the handling, the uncorrectable error may be re-detected and re-reported. Also, as described above, a single bit error with syndrome value greater than $38_{10}$ may be re-stored and subsequently re-read—even though it in fact represents an uncorrectable error.

In order to identify such uncorrectable errors, a special syndrome may be used. When this special syndrome is identified, the reader of the data may know that the corresponding data is not usable (i.e., contains an uncorrectable error) and the uncorrectable error has already been detected and reported. In one embodiment, rather than storing data with an uncorrectable error with its corresponding check bits, the data is stored with the inverse of its check bits. Subsequently, if the data is read by another reader, the new reader will regenerate check bits for the data and generate the corresponding syndrome. However, since the check bits which were stored with the data are the inverse of the "actual" check bits, the corresponding syndrome will be generated with all "1"s (e.g., $1111111_2$). According to the above description, a syndrome with an odd number of "1"s generally represents a correctable error. However, if this special pattern is detected, then an uncorrectable error is indicated. It is also noted that this special pattern is not a valid pattern for representing single bit errors. Data corresponding to such a special pattern may be deemed "NotData" for ordinary computation purposes.

The following example illustrates the above approach. Assume original uncorrupted data and check bits are as follows:

Data[D31:D00] = 10000000 00000000 00000000 00000000
Check Bits[E6:0] = 0100110

The Data is then corrupted with a double bit error and when read has a value and regenerated check bits of:
Data[D31:D00]=10000000 00000000 00000000 00000011 Check Bits[E6:0]=0011010

In this case, the syndrome is generated as (0100110) bitwiseXOR (0011010)=0111100. As there are an even number of bits with value "1", a double bit error is detected. Therefore, rather than storing the data with check bits 0011010, the check bits are first inverted and stored as 1100101. Subsequently, if the data is read again, new check bits will be regenerated from the data as 0011010 and generation of the syndrome will result in (0011010) bitwiseXOR (1100101)=1111111, which indicates the data contains a previously uncorrectable error. Therefore, the reader should not use the data and should not report the error.

In addition to the above, it is also noted that the above approach may generally be protected from single bit errors itself. For example, assume an uncorrectable error is detected and the corresponding inverted check bits are stored as described above. Assume then that a single bit error occurs in the inverted check bits. In such a case, the syndrome which is generated will have six "1"s and a single "0". According to the above described approach, such a syndrome indicates an uncorrectable error which may be acceptable.

In another example, assume data with an uncorrectable error is stored with its associated inverted check bits as described above. Then assume a bit of the data is flipped. According to the above approach, as described with reference to table 360 of FIG. 3, each data bit contribute to an odd number of check bits. Therefore, if a data bit is flipped, then an odd number of check bits will be flipped as well. As the special syndrome pattern comprises an odd number (seven) of "1"s, then flipping an odd number of syndrome bits will result in an even number of syndrome bits being set to "1". According to the above approach, a syndrome with an even number of bits set to "1" indicates an uncorrectable error which may be a generally acceptable result. It is noted that it is possible a double bit error could potentially be treated as valid data with a correctable error. However, the probability of such a failure is relatively remote.

Figure 4:
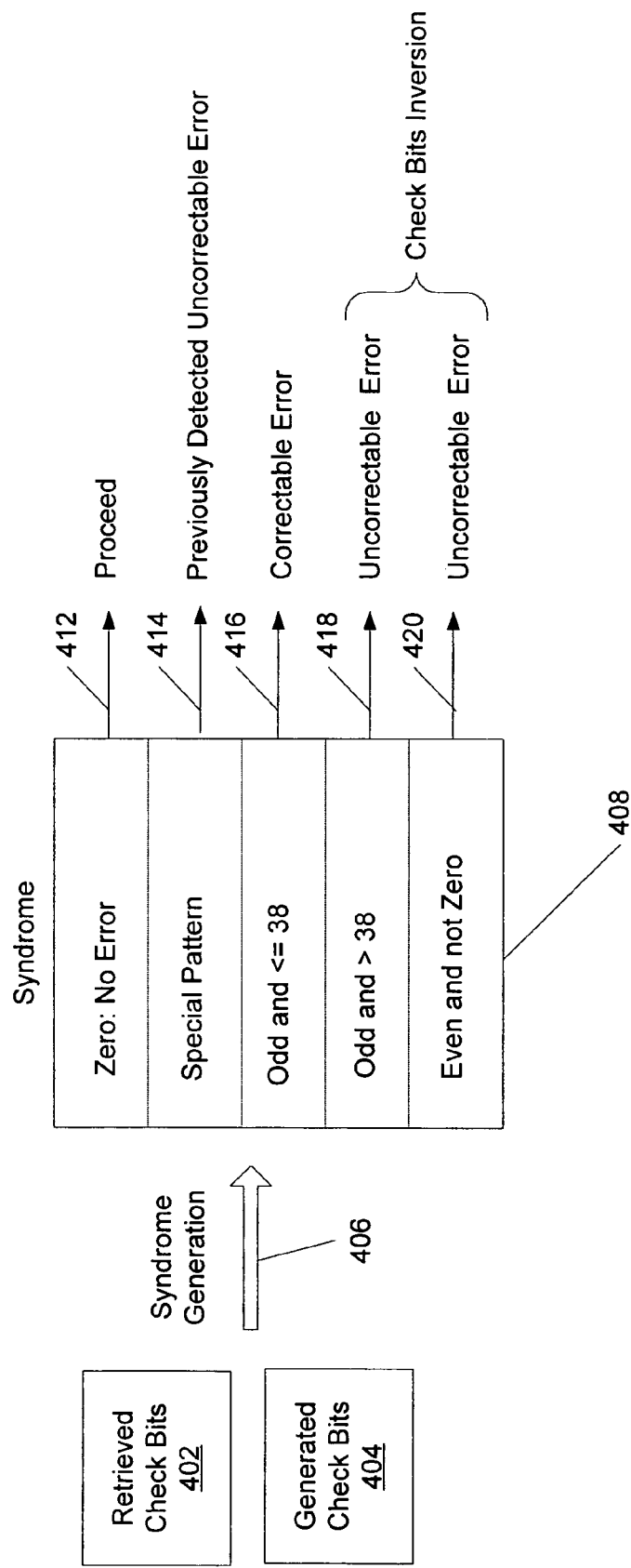
FIG. 4 illustrates syndrome generation and corresponding actions.

FIG. 4 illustrates an overview of the above described syndrome generation and checking process. In the example shown, check bits 402 corresponding to retrieved data are also retrieved. New check bits 404 are then generated for the retrieved data. Utilizing the retrieved 402 and generated 404 check bits, a syndrome is generated 406. Depending upon the syndrome generated, one or more actions may be taken. Table 408 depicts various types of syndromes which may result from the syndrome generation process 406. If the generated syndrome is all zeroes 412, then no error is detected and processing may continue. If the syndrome equals the special pattern 414, then the data contains a previously detected uncorrectable error. In such a case, the data is generally not usable and an error report should not be generated.

If the syndrome includes an odd number of bits equal to "1", and the binary value of the bits of the syndrome which correspond to the single error correcting check bits (e.g., bits 0-5 in the above discussion) are less than or equal to the decimal value 38 (416), then a single bit error is indicated and the indicated bit may be corrected. If the syndrome includes an odd number of bits equal to "1", and the binary value of the syndrome is greater than 38 (418), then an uncorrectable error is indicated. Also, if the syndrome includes an even number of bits equal to "1" and is not all zeroes (420), then an uncorrectable error is indicated. In the event of an uncorrectable error (418 or 420), the generated check bits 404 corresponding to the data are first inverted before being stored. In this manner, a subsequent reader of the data will generate a syndrome with the special pattern as described above.

Figure 5:
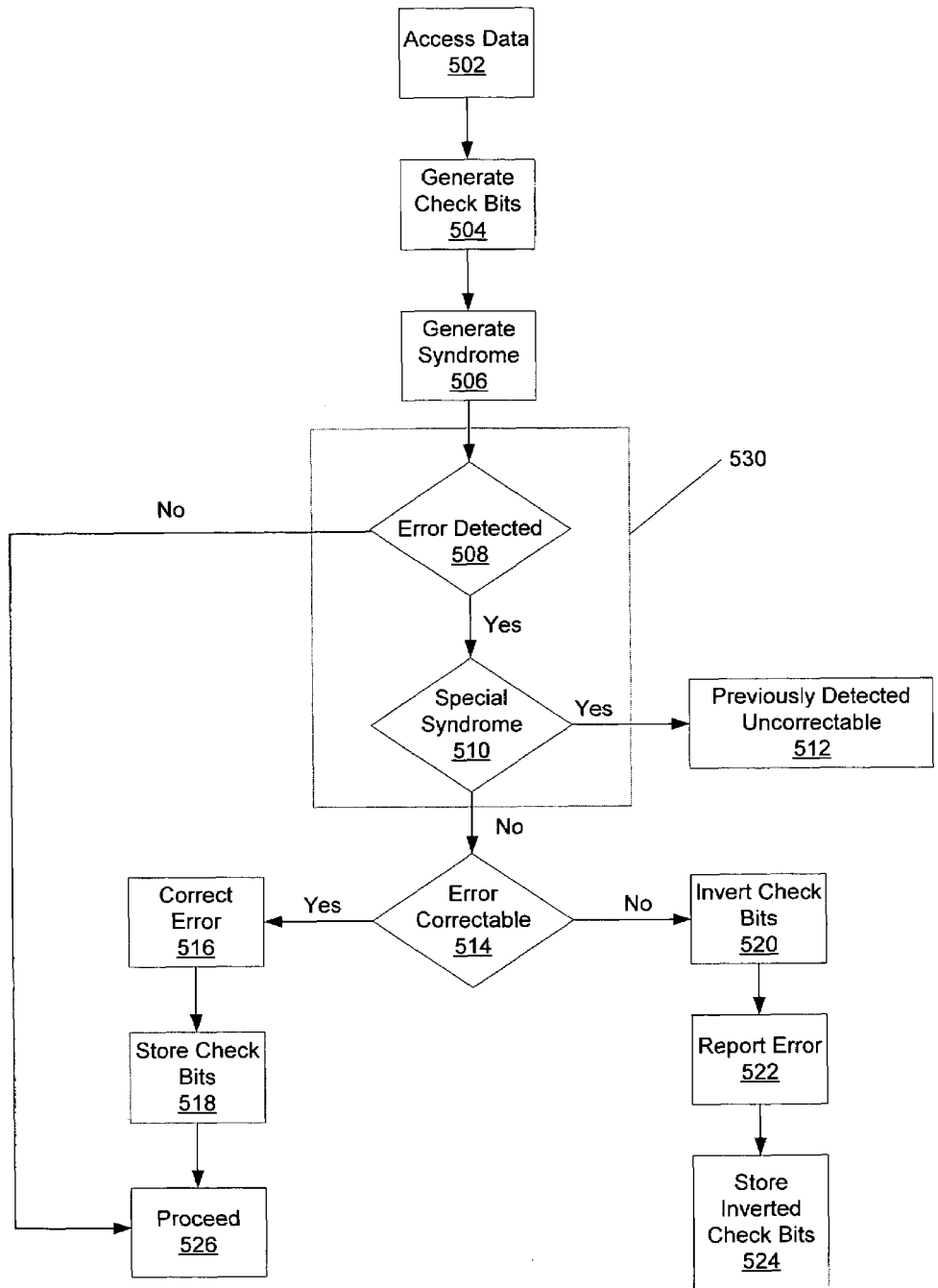
FIG. 5 depicts one embodiment of a method for performing error detection and correction.

FIG. 5 illustrates one embodiment of a method according to the above description. Subsequent to performing a read of data and its corresponding check bits (block 502), check bits are regenerated for the data (block 504). The read check bits and regenerated check bits are then utilized to generated a syndrome (block 506). If the syndrome indicates no error is present (decision block 508), then the process may simply proceed as appropriate (block 526). On the other hand, if the syndrome indicates the presence of an error (decision block 508), and the syndrome matches the predetermined special pattern (decision block 510), then a previously detected uncorrectable error has been detected (block 512). If the syndrome does not match the special pattern (decision block 510), then a determination is made (decision block 514) as to whether a correctable error is indicated, or an uncorrectable error is indicated. If an uncorrectable error is indicated (decision block 514), then the generated check bits are inverted (block 520), the error may be reported (block 522), and the inverted check bits stored (block 524). If a correctable error is indicated (decision block 514), then the error may be corrected (block 516) and the generated check bits may be stored (block 518), and the process may proceed (block 526). In the event the data is not being stored (e.g., the data is being immediately consumed), the check bits may not be stored as indicated by block 518.

Numerous variations and modifications will become apparent to those skilled in the art once the above disclosure is fully appreciated. For example, while a particular ECC coding has been used for purposes of discussion, those skilled in the art will appreciate that the methods and mechanisms described herein may be utilized with a wide variety of encoding. It is intended that the following claims be interpreted to embrace all such variations and modifications.

What is claimed is:

1. A method comprising:
    receiving data and corresponding first check bits from a storage device;
    generating second check bits corresponding to the received data;
    generating a first syndrome using the first check bits and the second check bits; and
    inverting the second check bits and storing the second check bits, in response to determining the first syndrome indicates an uncorrectable error;
    storing the received data in association with the inverted second check bits;
    receiving the stored data and stored inverted second check bits;
    generating third check bits corresponding to the retrieved stored data;
    generating a second syndrome using the first check bits and the second check bits; and
    determining the received stored data includes a previously detected uncorrectable error, in response to determining the second syndrome matches a predetermined syndrome.

2. The method as recited in claim 1, further comprising:
    detecting and correcting a single bit error corresponding to the stored data and second check bits, in response to determining the second syndrome indicates a single bit error; and
    reporting an uncorrectable error in response to determining the second syndrome indicates an uncorrectable error.

3. The method as recited in claim 2, wherein in response to determining the second syndrome matches a predetermined syndrome, an error corresponding to the previously detected uncorrected error is not reported.

4. The method as recited in claim 1, wherein the first check bits are utilized to implement a single error correcting, double error detecting code.

5. The method as recited in claim 4, wherein a first set of bits of the first syndrome are used to identify and correct an erroneous bit position in the retrieved data, in response to determining the second syndrome indicates a single bit error.

6. The method as recited in claim 5, wherein in response to determining an odd number of bits of the syndrome are equal to the binary value "1" and the first set of bits represent a value greater than the number of bits in the retrieved data and first check bits combined, the first syndrome indicates an uncorrectable error.

7. An apparatus comprising:
    one or more storage devices configured to store data and corresponding check bits; and
    error correction circuitry coupled to receive data and check bits from the one or more storage devices;
    wherein in response to receiving data and corresponding first check bits, the error correction circuitry is configured to:
        generate second check bits corresponding to the received data;
        generate a first syndrome using the first check bits and the second check bits; and
        invert the second check bits and store the second check bits, in response to determining the first syndrome indicates an uncorrectable error;
    wherein the received data is stored in association with the inverted second check bits, and
        wherein the error correction circuitry is further configured to:
        receive the stored data and stored inverted second check bits;
        generate third check bits corresponding to the received stored data;
        generate a second syndrome using the first check bits and the second check bits;
        compare the second syndrome to a predetermined pattern; and
        determine the received stored data includes a previously detected uncorrectable error, in response to determining the second syndrome matches a predetermined syndrome.

8. The apparatus as recited in claim 7, wherein the error correction circuitry is further configured to:
    detect and correct a single bit error corresponding to the stored data and second check bits, in response to determining the second syndrome indicates a single bit error; and
    report an uncorrectable error in response to determining the second syndrome indicates an uncorrectable error.

9. The apparatus as recited in claim 8, wherein in response to determining the second syndrome matches a predetermined syndrome, an error corresponding to the previously detected uncorrected error is not reported.

10. The apparatus as recited in claim 7, wherein the error correction circuitry is configured to use the first check bits to implement a single error correcting, double error detecting code.

11. The apparatus as recited in claim 10, wherein a first set of bits of the first syndrome are used to identify and correct an erroneous bit position in the retrieved data, in response to determining the second syndrome indicates a single bit error.

12. The apparatus as recited in claim 11, wherein in response to determining an odd number of bits of the syndrome are equal to the binary value "1" and the first set of bits represent a value greater than the number of bits in the retrieved data and first check bits combined, the first syndrome indicates an uncorrectable error.

13. A computing system comprising:
    one or more memory devices configured to store data and corresponding check bits; and
    a processor coupled to access data in the one or more memory devices, wherein in response to receiving data and corresponding first check bits, the processor is configured to:
        generate second check bits corresponding to the received data;
        generate a first syndrome using the first check bits and the second check bits; and
        invert the second check bits and store the second check bits, in response to determining the first syndrome indicates an uncorrectable error;
        receive the data and stored inverted second check bits;
        generate third check bits corresponding to the received data;
        generate a second syndrome using the first check bits and the second check bits;
        compare the second syndrome to a predetermined pattern; and
        determine the received data includes a previously detected uncorrectable error, in response to determining the second syndrome matches a predetermined syndrome.

14. The computing system as recited in claim 13, wherein the processor is further configured to:

detect and correct a single bit error corresponding to the stored data and second check bits, in response to determining the second syndrome indicates a single bit error; and report an uncorrectable error in response to determining the second syndrome indicates an uncorrectable error.

15. The computing system as recited in claim 14, wherein in response to determining the second syndrome matches a predetermined syndrome, an error corresponding to the previously detected uncorrected error is not reported.

* * * * *